United States Patent

Desai et al.

[11] Patent Number: 5,319,374
[45] Date of Patent: Jun. 7, 1994

[54] PRECISE UNIVERSAL TIME FOR VEHICLES

[75] Inventors: Simon Desai, San Jose; James G. MacKnight, Morgan Hill, both of Calif.

[73] Assignee: Trimble Navigation Limited, Sunnyvale, Calif.

[21] Appl. No.: 11,988

[22] Filed: Feb. 2, 1993

[51] Int. Cl.$^5$ .......................... G01S 1/24; G01S 5/02; G01S 3/02; G04C 11/02
[52] U.S. Cl. ................................. 342/387; 342/357; 342/457; 368/47
[58] Field of Search ............... 342/352, 356, 357, 387, 342/457; 368/47, 46, 14

[56] References Cited

U.S. PATENT DOCUMENTS

4,232,313  11/1980  Fleishman ........................ 364/452
5,220,333   6/1993  Penrod ............................. 342/385

Primary Examiner—Gregory C. Issing
Attorney, Agent, or Firm—John Schipper

[57] ABSTRACT

Method and apparatus for providing precise universal time coordination or synchronization for each of a plurality of N vehicles, numbered consecutively $i=1, 2, \ldots, N$ ($N \geq 2$) that move within a selected geographic region and that communicate by radiowaves with one or more base stations located within or adjacent to the selected region. Each vehicle is provided with a sequence of Satellite Positioning System (SPS) signals, with a sequence of SPS timing signals, and with a SPS signal transceiver/processor that receives the SPS signals and SPS timing signals and determines the present location of the vehicle and the time the vehicle location determination is made. One or more base stations broadcast a sequence of base station timing signals that are received by each vehicle. A timing signal choice means on each vehicle receives the SPS timing signals sequence and the base station timing signals sequence and chooses the timing signal sequence that is both presently available and presently the most accurate. A sequence of nonoverlapping time slots is determined that includes substantially all times within a selected time interval. An ith group of these time slots is allocated to vehicle number i, with no two of these groups having one or more time slots in common. An on-board clock provides back-up time if SPS and base station timing signals are both unavailable; on-board clock time is continually corrected by SPS time or base station time, if available. The chosen sequence of timing signals for vehicle number i is then used to determine the times within the ith group of time slots during which that vehicle will transmit selected vehicle operating data, including present vehicle position, to one or more base stations. At any time, the chosen sequence of timing signals is accurate to within a range as low as 2–7 milliseconds. The Satellite Positioning System may be a Global Positioning System, a Global Orbiting Navigational System, or any other satellite-based system that provides accurate information on position and/or time of observation.

25 Claims, 6 Drawing Sheets

PRECISE UNIVERSAL TIME FOR VEHICLES

FIELD OF THE INVENTION

This invention relates to provision and synchronization of time aboard a vehicle, using satellite positioning system signals and/or timing signals transmitted over a radio network.

BACKGROUND OF THE INVENTION

Where two or more vehicles, such as a fleet of buses or trucks, are connected electronically to one or more base stations, for purposes of periodically reporting operating data such as vehicle position and vehicle operating parameters to the base station, maintenance of a common accurate time for each vehicle and for the base station(s) is a concern. The vehicles may report their respective operating data by time sharing of access on a metropolitan area network, using an access allocation such as time division multiple access ("TDMA") or some other suitable access allocation approach. In time shared access, each vehicle in the network would be allocated one or more time slots in a given time interval to report its operating data to the base station(s). One or more additional time slots are optionally available (1) to allow the base station to poll the vehicle communications systems ("VCSs") for any additional information that should be communicated promptly to the base station and/or (2) to allow each VCS to attempt to communicate such information to the base station by contention during this additional time slot(s). This second time slot access mechanism is allocated using ALOHA, as discussed by M. Schwartz, *Computer Communication Network Design and Analysis*, Prentice Hall, 1977, pp. 286–320.

Several workers have disclosed time distribution systems using a master or base station and one or more subsidiary time signal receivers. An example is U.S. Pat. No. 3,520,128, issued to Novikov et al. An independent primary clock is connected to, and provides exact time signals for, a plurality of secondary clocks by radio waves. Each secondary clock receives a sequence of uncorrected "exact" time signals and a sequence of timing marks to correct this uncorrected time. The time signals for each secondary clock are apparently corrected separately.

Cater, in U.S. Pat. No. 3,811,265, discloses transmission of coded, time-indicating signals from a master clock at a central station to one or more slave clocks, using a two-wire line and binary-valued pulses with different time durations. A time synchronizing pulse is periodically inserted (e.g., once per second) on the line to correct for drift or other errors. If the two-wire line is a standard 60-cycle power line or a television cable, the binary-valued pulses use one or more frequencies that lie outside the frequency range normally used on that line, to avoid signal interference with the standard signals transmitted over that line.

A clock that can be synchronized by "wireless" signals is disclosed by Gerum et al in U.S. Pat. No. 3,881,310. The clock contains an electromagnetically operated mechanical oscillator whose frequency $2f0$ is twice the rated frequency of an alternating current network connected to the clock. A time synchronization module transmits a signal of frequency $f1 >> f0$ that is modulated by the network at $2f0$ and received and demodulated using the clock. Normally, the pulses received from the network drive the clock and the oscillator is in a standby mode. The clock oscillator is enabled, and the network is disconnected, when and only when the network frequency differs by at least a predetermined amount from the frequency $2f0$ of the oscillator. The oscillator in standby mode receives resonance energy of frequency $\approx 2f0$ from the network for maintaining the oscillations.

U.S. Pat. No. 3,967,098, issued to Harnagel et al, discloses an air navigation instrument that combines calculator and timekeeping functions. An initial time is entered into an accumulator of the device, and the device computes and displays time in increments $\Delta t = 1$ sec (or other chosen time interval) as the navigation calculations proceed. The time count can be captured and used in calculations at any time.

A TACAN air navigation system is disclosed in U.S. Pat. No. 3,969,616, issued to Mimken. Range of an aircraft from an interrogation signal-transmitting beacon is determined by the time elapsed between transmission of the interrogation signal and receipt of a reply pulse signal from the aircraft (called a "dwell" period in TACAN parlance). A circuit at the beacon generates and uses a filler pulse during any dwell period in which a reply pulse is not received from a target aircraft, in order to maintain an rough and unspecified synchronization at the beacon for the target aircraft when reply pulses are not received. An aircraft velocity detector may be included, with velocity being determined by averaging over several successive dwell periods to reduce the associated velocity error.

Cateora et al, in U.S. Pat. No. 4,014,166, disclose a satellite-controlled digital clock system for maintaining time synchronization. A coded message containing the present time and satellite position is transmitted from a ground station to an orbiting satellite and is relayed to a group of ground-based receivers. A local oscillator aboard the satellite is phase-locked to a precise frequency to provide the system with accurate time-of-year information by a count of the accumulated pulses produced by the oscillator. This count is compared with a time count determined from the coded message received by the satellite. After a selected number of errors are observed through such comparisons, the on-board clock is reset to the time indicated by the coded messages received. If transmission of the coded messages is interrupted, the on-board oscillator continues to provide time information that is transmitted to the ground-based receivers.

An antenna space diversity system for TDMA communication with a satellite is disclosed by U.S. Pat. No. 4,218,654, issued to Ogawa et al. Differences of temporal lengths of paths from the satellite through each antenna to a ground-based signal processor station are determined by measurement of times required for receipt of pre-transmission bursts sent in the respective allocated time slots through two different antennas, in a round trip from base station to satellite to base station. Variable time delays are then inserted in the base station signal processing circuits to compensate for the temporal length differences for the different signal paths. These time delays are changed as the satellite position changes relative to each of the antennas.

U.S. Pat. No. 4,287,597, issued to Paynter et al, discloses receipt of coded time and date signal from two geosynchronous satellites, which signals are then converted into local date and time and displayed. The frequency spectrum is scanned by an antenna to identify and receive the satellite signals. Temporal length differences for signal paths from each satellite through a receiving antenna to a signal processing base station are determined, to provide compensation at the base station for these differences. Time information is provided by a satellite every 0.5 seconds, and this information is corrected every 30 seconds. Signals from either or both satellites are used to provide the time and date information, in normal local time and/or daylight savings local time.

Jueneman discloses an open loop TDMA communications system for spacecraft in U.S. Pat. No. 4,292,683. A spacecraft, such as a satellite, in quasi-geosynchronous orbit carries a transponder that relays a coded signal from a ground-based signal-transmitting station to a plurality of spaced apart, ground-based receivers. This coded signal includes a time index and an index indicating the spacecraft's present position. The time index is adjusted by each receiver to compensate for the changing position of the spacecraft through which the coded signal is relayed. The system is open loop and requires no feedback from the receivers to the base station.

Nard et al, in U.S. Pat. No. 4,334,314, discloses a system for radio wave transmission of time-referenced signals between two ground-based stations, with compensation for multi-path transmission timing errors. Station no. 1 has a single antenna. Station no. 2 has two antennas, spaced apart by a selected distance, to allow measurement of and compensation for multi-path transmission path length differences. A signal processor located at the receiver antenna combines a plurality of timing marks, received from the transmitting antenna along multiple paths, into a single timing mark that compensates for the multiple path length differences. This arrangement allegedly allows station-to-station transmission over distances as large as ten times the trans-horizon or direct sighting distance (which is approximately proportional to the square root of the product of antenna height and Earth's radius).

Method and apparatus for determining the elapsed time between an initiating event and some other event are disclosed by U.S. Pat. No. 4,449,830, issued to Bulgier. A first timer and a second timer mark the times of occurrence, respectively, of an initiating event and a subsequent event that depends upon occurrence of the initiating event. The two timers are initially connected and synchronized, then disconnected before the initiating event occurs. The timers are then reconnected after both events have occurred, to allow determination of the elapsed time between occurrence of the two events.

In U.S. Pat. No. 4,482,255, Gygax et al disclose a timepiece for displaying both the present time and the present orientation of the time piece relative to the local Earth's magnetic field. The timepiece displays time, date, and the direction and angle through which the timepiece must be rotated in a tangent plane to align a fixed axis on the timepiece with the local field. The local magnetic field direction can be determined by two (static) Hall effect sensors placed at right angles to each other.

Distance ranging and time synchronization between a pair of satellites is disclosed by Schwartz in U.S. Pat. No. 4,494,211. Each satellite transmits a timing signal and receives a timing signal from the other satellite. The difference in time, including compensation for signal processing delay on a satellite, between transmission and receipt of the signals is transmitted by each satellite to the other satellite and is used to establish time synchronization and to determine the distance between the two satellites. This exchange of signals would be repeated at selected time intervals to maintain synchronization, where the satellites are moving relative to each other. No communications link to a third entity is required, and only one of the satellite clocks need be adjusted to establish and maintain time synchronization.

A portable timekeeping device that provides reminders (alarms) for taking certain actions at naturally occurring times is disclosed in U.S. Pat. No. 4,512,667, issued to Doulton et al. Means are provided for entering information on the present geographical location, and the device computes the appropriate times for taking the actions based upon the location and local time of day and year. The intended application here is for an alarm indicating the appropriate times after sunrise and before sunset for Moslem prayers. The present geographical location is entered and used together with the present time and present time of year (computed using a timekeeping device plus information stored in a ROM) to determine the appropriate times of day. A visually or audibly perceptible alarm is provided at each appropriate time of the day.

Plangger et al, in U.S. Pat. No. 4,582,434, disclose transmission and receipt of a continuously corrected single sequence of timing signals. A microprocessor at the receiver periodically compares these timing signals with on-board timing signals generated by a local clock. A varactor diode in a crystal oscillator circuit adjusts the microprocessor's operating frequency to minimize any error between the two timing signal sequences. Timing signal processing delay time is compensated for in a receiver circuit. The frequency for microprocessor operation is thus continuously corrected. If the transmitted timing signals are too weak or do not arrive, the on-board timing signals control the microprocessor until the transmitted timing signals are received in sufficient strength again.

Noguchi discloses a remote time calibration system using a satellite in U.S. Pat. No. 4,607,257. A base station provides a reference system of absolute timing signals and transmits these to a satellite that orbits the Earth. The satellite then calibrates and periodically adjusts its internally generated time and transmits observed data plus the corresponding adjusted satellite time to one or more data receiving stations on the Earth that are distinct from the base station. Time calibration optionally compensates for signal propagation time delay from base station to satellite and allows continuous transmission of data from satellite to the data receiving station(s). Several time difference indicia are computed here.

These approaches usually rely upon a single clock for time distribution. If signals from that clock are unavailable, or if the clock itself fails or is interrupted, no timing signal is available for the subsidiary systems. What is needed is a timing distribution system that provides a timing signal back-up that can be used whenever the primary timing signal is unavailable or, optionally, can be used intermittently to supplement the more accurate primary timing signal.

SUMMARY OF THE INVENTION

These needs are met by the invention, which provides a sequence of Satellite Positioning System (SPS) position and timing signals, used as the primary timing signal and accurate to within a few microseconds, which are received by a plurality of land or marine vehicles whose positions on the Earth may be changing with time. A secondary, less accurate timing signal, using either SPS signals or a more accurate time standard, is transmitted by a base station on the Earth and received by each of the vehicles. An optional tertiary timing signal, which may be the least accurate, is provided by a clock on board each vehicle itself. When the primary timing signal is unavailable, the secondary (tertiary) timing signal is used for timekeeping aboard the vehicle, until the primary timing signal is again available. The primary and secondary timing signals take account of time delays due to signal propagation and to signal processing at the vehicle. An on-board SPS signal receiver/processor receives and processes the SPS signals from one or more satellites and also receives TDMA time packet signals from one or more base stations that are located in or adjacent to the region where the vehicles move. The receiver/processor also collects operations data from the vehicle and periodically transmits such data to one or more base stations for analysis or archiving, using one or more of the time slots allocated to that vehicle by the TDMA protocol.

DESCRIPTION OF EMBODIMENTS OF THE INVENTION

Figure 1:
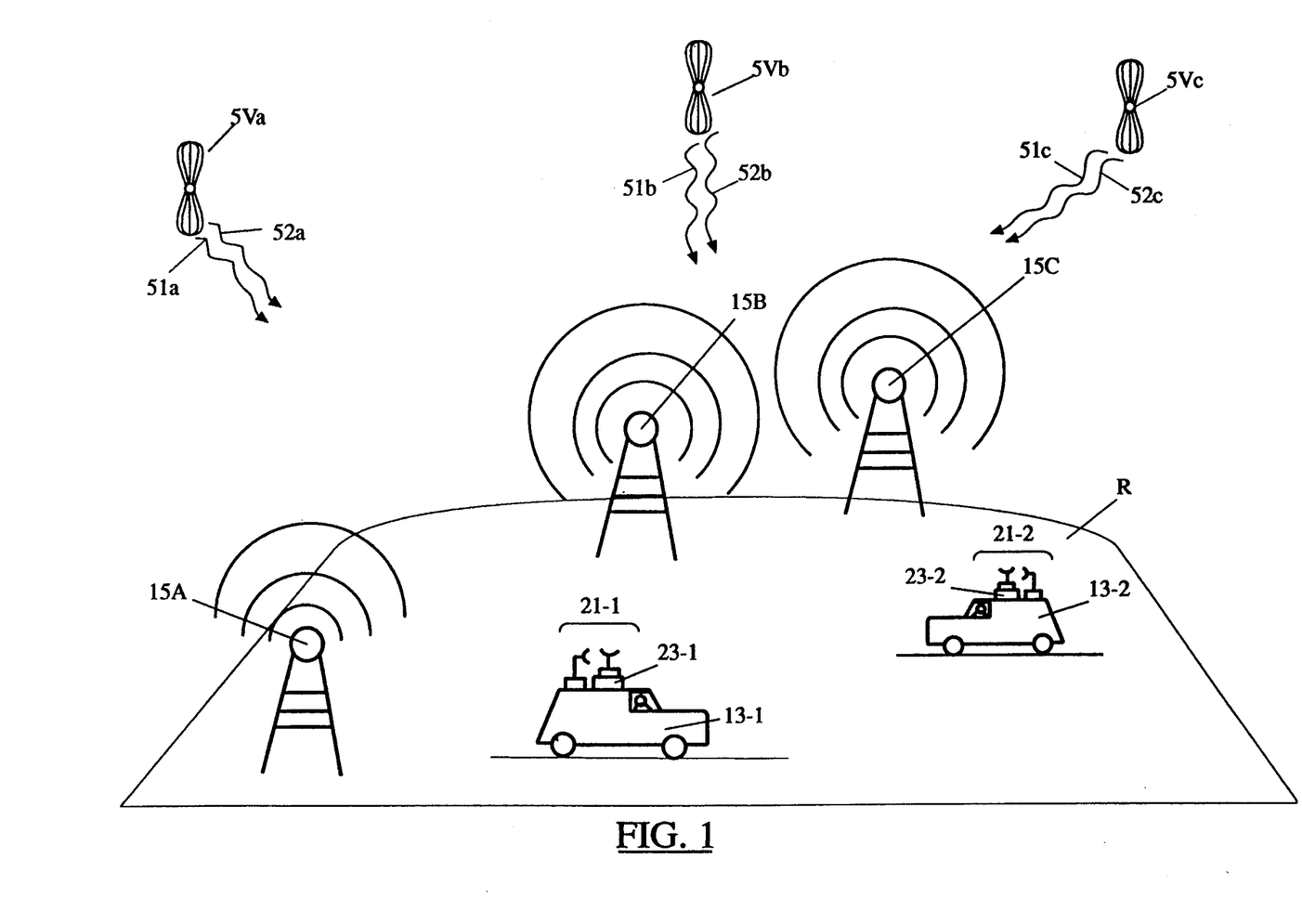
FIG. 1 is a schematic view of an environment in which the invention is used.

FIG. 1 illustrates an environment in which the invention is useful. Vehicles, such as buses or trucks, 13-1, 13-2, etc. in a fleet move within a region R and communicate by radiowave or otherwise with one or more base stations located within or adjacent to the region R. Each vehicle 13-i carries an intelligent vehicle logic unit ("IVLU") 21-i that includes an SPS signal receiver/processor 23-i (i=1, 2, ...) that can receive radiowave signals from, and transmit radiowave signals to, one or more base stations 15x (x=A, B, C, etc.), according to an appropriate time allocation system such as TDMA so that each such receiver/processor is assured of an opportunity to communicate with a base station 15x during one or more time slots in each time interval of a selected length $\tau_c$. For a large fleet of vehicles 13-i, the length $\tau_c$ may be of the order of 1-10 minutes.

Each vehicle 13-i has an (optional) system interrogator 17-i (i=1, 2, ...) that gathers relevant operating data on the vehicle and periodically transmits these data to the base station, using a modem 27-i that is carried on the vehicle 13-i. One such item of information or data transmitted is the present location of the vehicle 13-i. Each vehicle's receiver/processor 23-i also receives SPS signals S1x and/or S2x with different corresponding carrier frequencies f1 and/or f2, respectively, from one or more SPS satellites SVx (x=a, b, c) that are directly visible from that vehicle. Because the vehicle operating data must be gathered and transmitted at precise times defined by the vehicle's allocated time slots, each of the vehicles requires an accurate timing signal. Each vehicle 13-i is provided with two, or optionally three, independent timing signal sequences for this purpose.

The SPS signal S1y or S2y (y=a, b, c) provides a highly accurate first timing signal sequence at times $\{t_{1m}\}_m$ referred to as "SPS time", if this signal is available, after compensation or allowance for time delay due to signal propagation $\Delta t_{prop}$ from a satellite SVx to the vehicle 13-i and time delay $\Delta t_{proc}$ due to time signal processing at the receiver/processor 23-i. This first timing signal sequence is received by the receiver/processor 23-i and used to initiate, or to update and correct, a vehicle timing signal sequence $\{t_{Vm}\}_m$ on the vehicle 13-i itself.

A second timing signal sequence $\{t_{2m}\}_m$, referred to as "RDT time" or radio downlink time, is provided by at least one base station 15x through a sequence of time packets that is regularly broadcast by that base station. This second timing signal sequence is also received by the receiver/processor 23-i and used to initiate, or to update and correct, the timing signal sequence $\{t_{Vm}\}_m$ on the vehicle 13-i itself. A timing signal choice module 31-i (i=1, 2, ...), which operates cooperatively with the receiver/processor 23-i on the vehicle 13-i, determines which timing sequence $\{t_{1m}\}_m$ or $\{t_{2m}\}_m$ will be used to update the vehicle timing sequence $\{t_{Vm}\}_m$, based upon availability of the SPS and radio timing signals, upon actual availability of that sequence, and other relevant criteria.

A third timing signal sequence $\{t_{3m}\}_m$, referred to as "RTC time", may be provided by a clock located on the vehicle 13-i itself, to updata and correct the vehicle timing signal sequence $\{t_{Vm}\}_m$ when the first and second timing signal sequences $\{t_{1m}\}_m$ and $\{t_{2m}\}_m$ are either unavailable or manifest unsatisfactory accumulated drifts with time. The RTC time may be provided by a clock used to regulate signal processing in a computer that is carried on each vehicle 13-i. The SPS time and the RDT time will be the same for each vehicle 13-i, but the RTC time will be generated on, and thus unique to, each vehicle 13-i.

Figure 2:
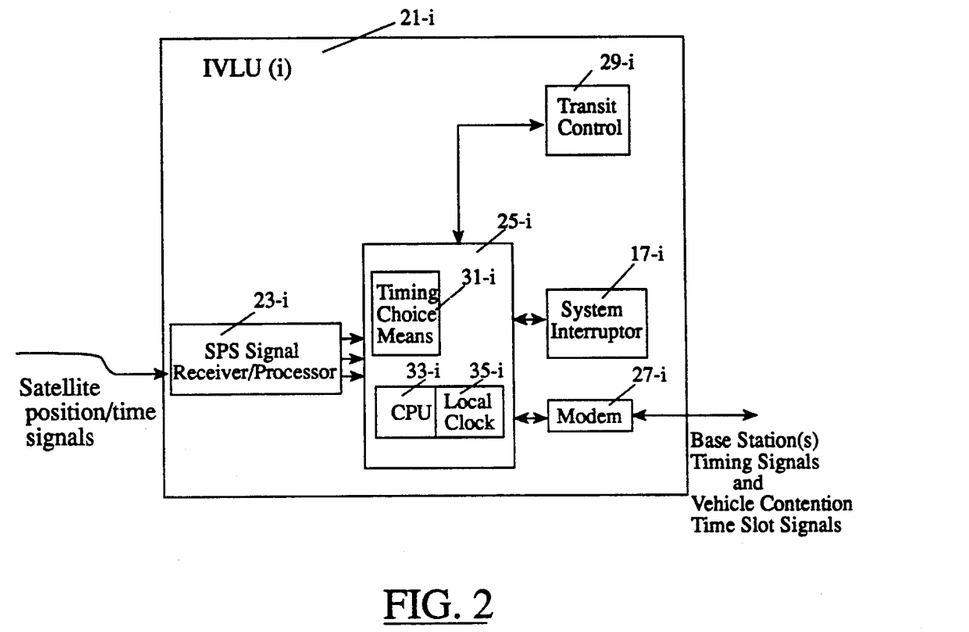
FIG. 2 is a schematic view of apparatus used in one embodiment of the invention.

FIG. 2 schematically illustrates one embodiment of an intelligent vehicle logic unit 21-i, carried on a vehicle 13-i, that is suitable for practice of the invention. The IVLU 21-i includes an SPS signal receiver/processor 23-i that receives the SPS signals from one or more satellites SVa, SVb, SVc, etc. and determines the present position of the vehicle 13-i and present time of observation. The IVLU 21-i also includes a vehicle interface module ("VIM") 25-i that provides software, logic hardware, computer processing and the third timing sequence $\{t_{3m}\}_m$ that provides RTC time for the IVLU 21-i. The IVLU 21-i also includes a modem 27-i that allows the IVLU to transmit messages to, and to receive messages from, one or more of the base stations 15x. These messages include the second timing sequence $\{t_{2m}\}_m$ that provides RDT time for the IVLU 21-i. The IVLU 21-i also includes a transit control interface (TCI) 29-i that is controlled by the operator of the vehicle 13-i, to provide the operator with present information on the time, position of the vehicle, or other operating data chosen for display by the operator. Within the IVLU 21-i, the SPS signal receiver/processor 23-i, the VIM 25-i, the modem 27-i and the TCI 29-i are electronically connected to provide input signals for one another.

The VIM 25-i includes a timing choice means 31-i that determines which of the three timing sequences $\{t_{ym}\}_m$ (y=1, 2, 3) received or self-generated by the IVLU 21-i will be currently used for calibration of the universal timing sequence $\{t_{Vm}\}_m$ provided for each vehicle, based upon criteria discussed below. The timing sequence used for $\{t_{Vm}\}_m$ is usually the RTC time. This RTC time is unadjusted, if RTC time is the "primary" time chosen by the timing choice means 31-i. However, if the SPS time or the RDT time is chosen as the primary time by the timing choice means 31-i, this primary time will be used to continually calibrate the RTC time as time unfolds, until a new primary time is chosen by the timing choice means.

The VIM 25-i also includes a CPU 33-i and associated memory and operating software for other processing of signals containing SPS time and position, RDT time, RTC time and vehicle operating data. The VIM 25-i also includes a local clock 35-i that provides the RTC time for the vehicle 13-i. As noted above, the clock that drives the CPU 33-i may serve as the local clock 35-i, or an independent local clock may be provided.

After the SPS and RDT timing marks are received and a choice of the presently more accurate timing mark is made by the timing choice means 31-i the present RTC timing mark is corrected, using an RTC time offset (positive or negative), so that the RTC timing marks themselves need not be continually manipulated. The corrected RTC time at any point is then expressed as $$t_{RTC}(\text{corrected}) = t_{RTC} + \Delta t_{offset},$$

where $\Delta t_{offset}$ is the last available accurate offset time from the SPS or RDT source. This offset time is preferably determined and provided by the timing choice means 31-i, by comparing an internal time stamp on the GPS signal or RDT packet presently received with the RTC time of the local clock. If only one timing mark sequence (SPS or RDT) is available, that sequence is used to determine the RTC time offset. If the timing mark sequences for SPS and RDT are both unavailable, the RTC time with the last available accurate RTC time offset is fixed and used to provide a timing mark sequence until GPS time or RDT time is recovered.

Figure 3:
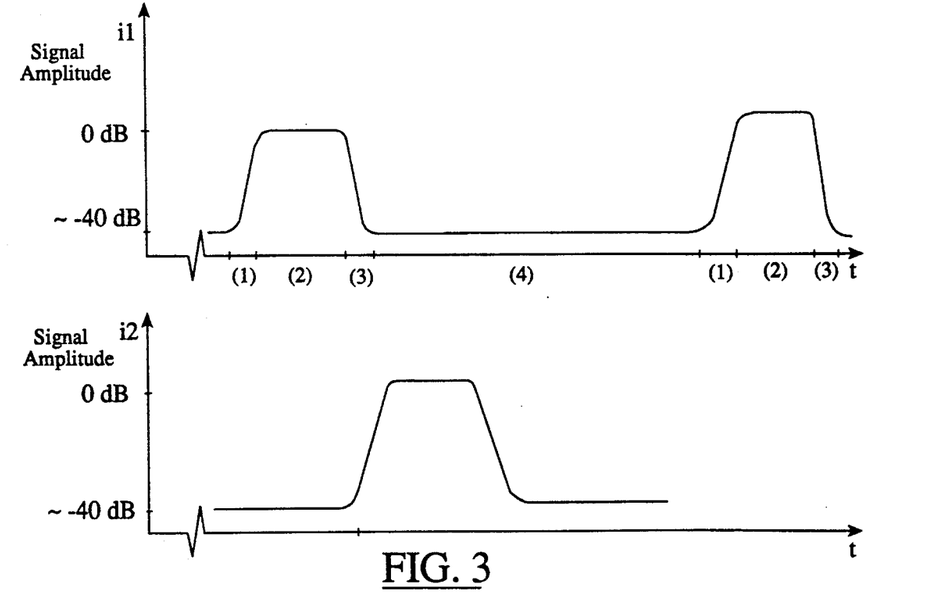
FIG. 3 is a graphical view illustrating partial overlap of receiver/processor signal transmission sequences for two vehicles, according to one embodiment of the invention.

For TDMA-scheduled reporting of vehicle position and other vehicle operating data, each vehicle is allocated one or more mutually exclusive time slots of a selected length $\Delta t_{slot,a}$ in each time interval of length $\tau_c$, and the allocated time for reporting must be accurately determined on board the vehicle with an inaccuracy of no more than a selected inaccuracy time interval $\tau_e$. The inaccuracy time interval $\tau_e$ is no greater than 7 msec in one embodiment and no greater than 2 msec in another embodiment, depending primarily upon design and operation of the modem 27-i. The signal receiver/processor 23-i (i=1,2, ...) has a "key-up time" (also known as radio attack time) $\Delta t_{up}$=5-15 msec, during which time the receiver/processor must move from an inactivated state to a 90 percent activated state, ready to transmit whatever is required. The receiver/processor 23-i also has a "key-down time" (also known as radio release time) $\Delta t_{down}$=5-15 msec, during which 23-i moves from a fully activated state to a 90 percent inactive state. Preferably, the key-up and key-down time intervals on a receiver/processor 23-i are staggered so that, as one unit 23-i1 is completing its key-down time interval, another unit 23-i2 is just beginning its key-up time interval. FIG. 3 illustrates this staggering of key-down and key-up time intervals for signal amplitudes transmitted by the two vehicles 13-i1 and 13-i2 as a function of time t. Each signal transmission by a receiver/processor 23-i during a TDMA time slot requires (1) a key-up time interval, (2) a signal transmission interval of length $\Delta t_{tr}$=40-50 msec, and (3) a key-down time interval, followed by (4) a quiescent time interval of much greater length $\Delta t_q$ before the next scheduled transmission by the vehicle 13-i. This requires tight control of the present time, as determined by the vehicle timing signal sequence $\{t_{Vm}\}_m$, to an inaccuracy of no more than $\tau_e$.

Each modem 27-i receives timing packets that provide the RDT timing signal sequence $\{t_{2m}\}_m$ that is broadcast by one or more base stations and, optionally, transmission demand signals addressed to a particular vehicle, when a base station determines that it immediately needs operating data or other information from that particular vehicle. In a preferred embodiment, a selected number N (for example, N=5-20) of consecutive TDMA time slots are allocated to scheduled transmission of operating data signals by N different vehicles to the base station 15x, followed by one or more contention time slots during which any vehicle 13-i may transmit a signal by contention for the air time, using a time-slotted ALOHA contention algorithm such as discussed in the book by M. Schwartz, ibid.

Figure 4:
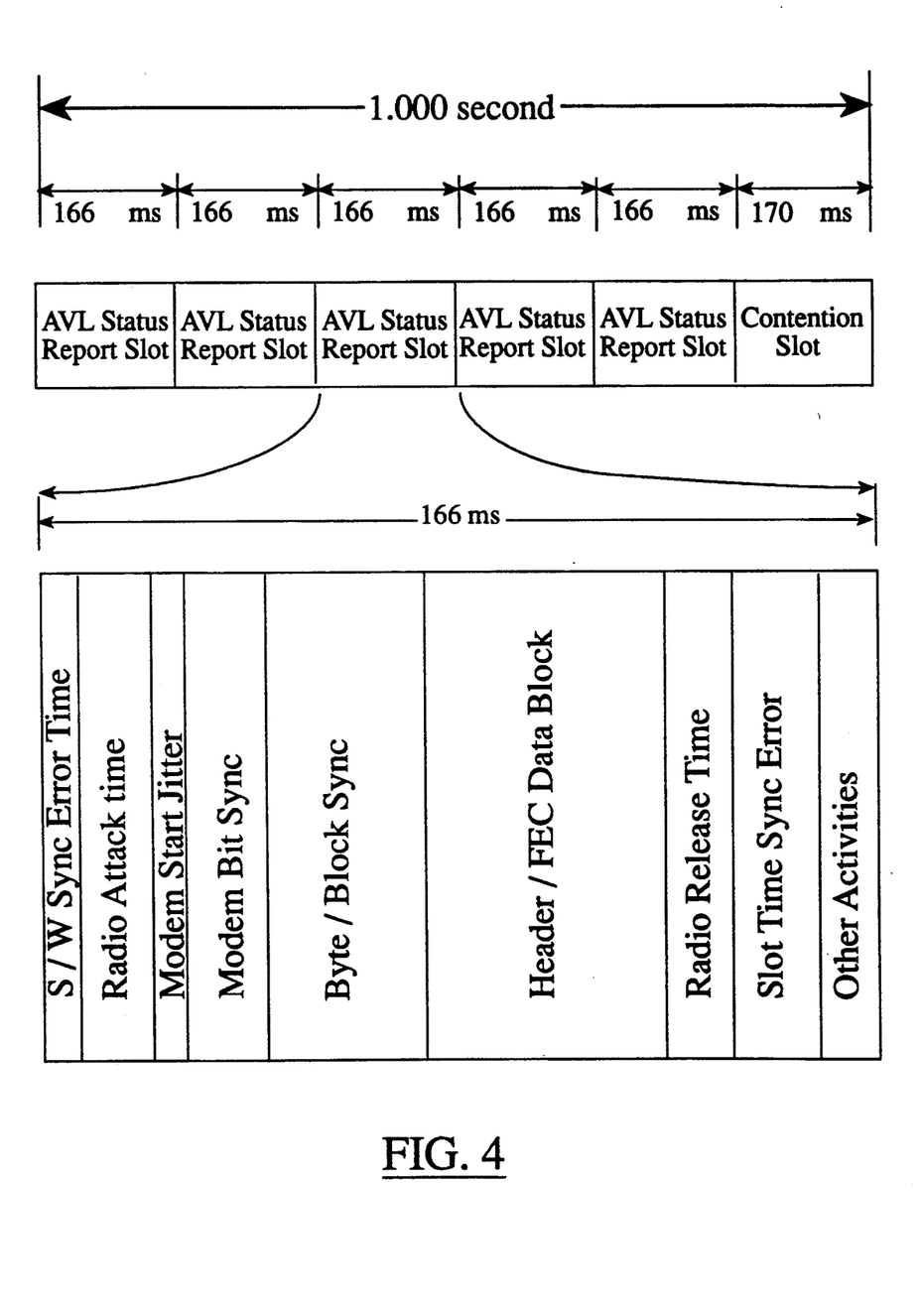
FIG. 4 is a schematic view illustrating the allocation of time intervals within an allocation time slot to time synchronization activities and to data transmission activities.

In one preferred embodiment, each 1.0 sec time interval is divided into 5 allocation time slots of length $\Delta t_{slot,a}$=166.0 msec each, during which only a designated vehicle may communicate with one or more of the base stations 15x, plus one contention time slot of length 170 msec, during which any vehicle may communicate with one or more of the base stations. FIG. 4 illustrates a suitable allocation of time intervals within an allocation time slot of length 166.0 msec to synchronization and data transmission activities:

| | |
|---|---|
| 1.0 msec | S/W sync error time |
| 15.0 msec | radio attack (key-up) time |
| 1.7 msec | modem start time jitter attenuation |
| 10.0 msec | modem bit sync time |
| 40.0 msec | byte block sync time |
| 73.3 msec | header/data/forward error correction block |
| 10.0 msec | radio release (key-down) time |
| 14.0 msec | slot time sync error determination |
| 11.0 msec | other activities |

Presently, the IVLU 21-i uses a Data Radio Turbo MRM modem, and signal processing by this modem requires these time intervals for the various modem input signal processing activities. Use of a different modem might require a group of time intervals different from those shown here.

The header/data/error correction block in FIG. 4 includes an 18-byte header, a 14-byte data block, and a 12-byte forward error correction (FEC) code, such as Reed-Solomon, whose bits are interleaved with the data bits. The 10 msec modem bit sync time component is included in the 166 msec time interval to guarantee that the receiving modem's receiver is locked onto the transmitting modem's signal. The modem byte block sync time represents 24 bytes, and a base station radio receiver must receive and recognize at least 24 bits in this sequence in order to become active and receive the subsequently arriving header/data/FEC block. The byte block sync header is used to advise the receiving modem where the first bit of the first byte of the header/data/FEC block begins.

In another preferred embodiment, with greater control incorporated over timing ambiguities for receipt of a signal by the modem 27-i, each one-second interval is divided into as many as 20 time slots of approximately uniform length ($\Delta t_{slot,a} \approx 50$ msec); and one or more of these time slots becomes available for contention transmission by the vehicle modems.

As noted above, three timing signal sources are used to provide time synchronization for determining the allocation time slots during which any particular vehicle is scheduled to transmit information to a base station: (1) SPS timing signals received directly by a receiver/processor on a vehicle; (2) radio downlink time (RDT) signals received by a receiver on the vehicle from one or more base stations; and (3) RTC timing signals received from a real time clock or other timing mechanism carried on the vehicle. A signal receiver/processor 23-i on a vehicle will generate and issue a clearly distinguishable pulse every 1.00 seconds for slot timing adjustment, if the receiver/processor continues to receive SPS signals from one or more of the SPS satellites. This pulse is referred to herein as the "SPS One PPS Signal". Arrival of this pulse is used to resynchronize CPU and/or TPU crystal oscillators, which produce the local real time clock (RTC) signal on an individual vehicle, to a correct time. The vehicle local timing signal may drift in a time interval between arrival of two consecutive SPS One PPS Signals but is resynchronized, ideally, at one second time intervals.

Table 1 sets forth seven mutually exclusive timing status states ("TSSs") that a vehicle timing system may occupy and occupation conditions for TSSs.

TABLE 1

| Trans State Dest | SPS Time Available? | RDT Time Available? | Origin of Transition | Primary Timing Source | Are Data Transmitted? |
|---|---|---|---|---|---|
| 0 | no | no | 1,2 | RTC | no |
| 1 | no | yes | 0,3 | RDT | yes |
| 2 | yes | no | 0,3,4 | SPS | yes |
| 3 | yes | yes | 1,2,5 | SPS | yes |
| 4 | no | no | 5,6 | RTC | no |
| 5 | no | yes | 4,6 | RDT | yes |
| 6 | no | x | PUP,0,4,5 | x | x |

In Table 1, an "x" entry indicates a "don't care" condition for the indicated variable and "PUP" indicates a power-up transition in which the system is initially activated or reactivated. When both SPS and RDT timing signals are available, the more accurate SPS timing signal becomes the primary timing source. When only one of these two timing signals is available, that signal becomes the primary timing source by default. When neither of these timing signals is available, as in timing status states 0 and 4, the RTC timing signal becomes the primary timing source. No data are transmitted from that vehicle in certain situations in which RTC time is the primary source and is not being periodically recalibrated by one of the more accurate timing sources (SPS time or RDT time), as discussed earlier.

Figure 5:
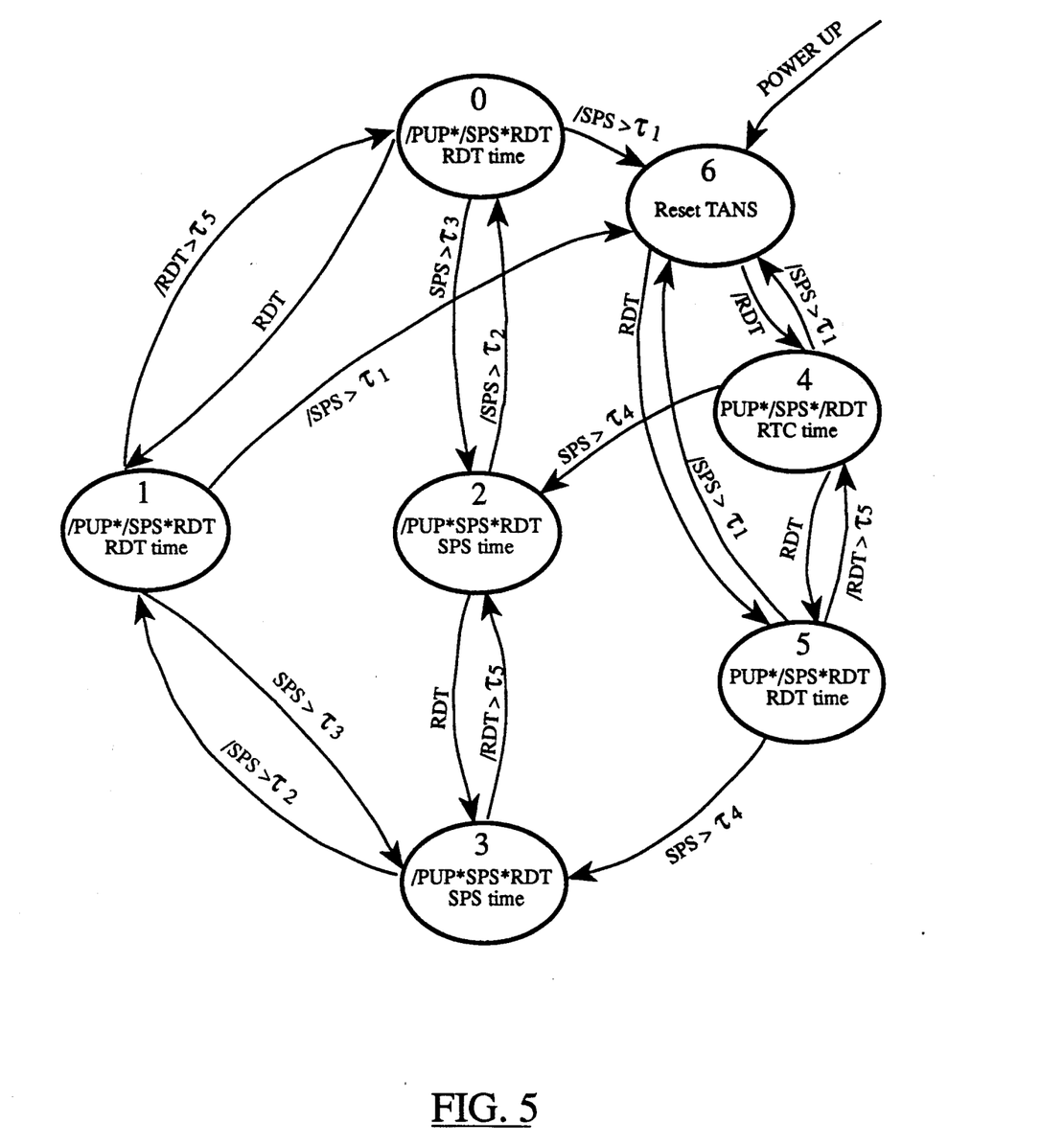
FIGS. 5, 6 and 7 are schematic views illustrating permitted transitions between seven timing status states and the conditions for such transitions, according to three embodiments of the invention.

FIG. 5 illustrates the 18 permitted transitions, plus power-up, among these 7 timing status states, from a theoretical population of $7^6 = 117,649$ possible transitions, and Table 2 sets forth the conditions for these 18 transitions for this embodiment of the invention.

TABLE 2

| Permitted Transitions Between Timing Status States | |
|---|---|
| TSS Transition | Condition(s) For Transition |
| 0 → 1 | RDT regained |
| 0 → 2 | SPS regained for > $\tau 3$ (3–6 sec.) |
| 0 → 6 | SPS lost for > $\tau 1$ ($\approx 60$ min.); power regained |
| 1 → 0 | RDT lost for $\tau 5$ (0–3.7 min.) |
| 1 → 3 | SPS regained for > $\tau 4$ (4–10 sec.) |
| 1 → 6 | SPS lost for > $\tau 1$ |
| 2 → 0 | SPS lost for > $\tau 2$ ($\approx 37.6$ min.) |
| 2 → 3 | RDT regained |
| 3 → 1 | SPS lost for > $\tau 2$ |
| 3 → 2 | RDT lost for > $\tau 5$ |
| 4 → 2 | SPS regained for > $\tau 4$; power lost |
| 4 → 5 | RDT regained |
| 4 → 6 | SPS lost for > $\tau 1$ |
| 5 → 3 | SPS regained for > $\tau 4$; power lost |
| 5 → 4 | RDT lost for > $\tau 5$ |
| 5 → 6 | SPS lost for > $\tau 1$ |
| 6 → 4 | RDT lost |
| 6 → 5 | RDT regained |

The threshold times $\tau 1$ and $\tau 2$ (for loss of SPS timing signal), $\tau 3$ and $\tau 4$ (for reacquisition of SPS timing signal) and $\tau 5$ (for loss of RDT timing signal) are determined based upon worst case scenarios for drift of the underlying timing mark. The numbers shown in Table 2 are merely one set of choices for these threshold times and are not the only choices that can be made within the invention.

Power-up of the system ("PUP" in Table 1) occurs through TSS 6, which has an RDT timing signal and a just-acquired SPS timing signal. Reset occurs from any TSS state, or when power is lost and the system returns to TSS 6. After Power Up or Reset, and until a satellite lock is acquired for at least one SPS satellite, the sequence of SPS One PPS Signals has an arbitrary phase relative to the desired and synchronized UTC time. This arbitrary phase can continue through any of the transition status states TSS 4, 5 or 6.

The SPS One PPS Signal is stabilized to within ±1 μsec. and has a nominal pulse width of about 1.8 μsec., and the signal phase is determined at a time interval about $\tau 4 = 4$–10 seconds after acceptable SPS position information is obtained from three or more satellites. The negative-going edge of the SPS One PPS Signal designates the accurate, time accurate edge. During this time interval, the SPS system on the vehicle makes all gross and fine adjustments needed for operation. This corresponds to the TSS transitions 5→3 and 4→2.

Once per hour, the SPS oscillator is corrected for any SPS receiver oscillator drifts, and this requires a recovery time of $\tau 3 = 3$–6 seconds. This corresponds to the TSS transitions 0→2 and 1→3.

If the receiver 23-i has missed SPS timing or SPS signal reception for $\tau 1 = 60$ consecutive minutes or more, the SPS system will be reset and the SPS signal reacquisition procedure will be begun again. This corresponds to TSS transitions 1→6, 4→6 and 5→6.

After the SPS satellite signal has been lost and before the RDT timing signal has become the primary timing signal, a time interval of length $\tau 2 = 37.6$ minutes may elapse, during which an extrapolated SPS timing signal remains the primary timing signal (before SPS receiver drift becomes unacceptable in a worst case scenario). The change that occurs at the end of this time interval corresponds to the TSS transitions 2→0 and 3→1. The corresponding maximum time for use of an RDT timing signal without reference to an acceptable primary timing signal standard is 3.7 minutes.

When RDT has become the primary timing signal and is subsequently lost, RTC time (initially calibrated by RDT time or by SPS time) will become the primary timing signal for $\tau 5 = 0-3.7$ minutes. During this time, data may be transmitted by the vehicle 13-i, because the possible drift in timing is within acceptable limits. The change that occurs at the end of the time interval $\tau 5$ corresponds to the TSS transitions 1→0, 3→2 and 5→4. This approach does not utilize the sequence of SPS-based One PPS Signals but continues to rely upon the CPU or TPU oscillator crystal for this time interval.

As a first alternative to the timing system described above, the sequence of SPS-based One PPS Signals could be immediately utilized as the primary timing signal. As a second alternative, an independent base station standard, such as pulses from a cesium or rubidium clock, previously synchronized to SPS-based One PPS Signals, could be utilized as a primary timing source. The longest time a vehicle timing system can operate, absent (re)calibration by an acceptable primary timing source, and stay within the permitted inaccuracy for an individual allocation time slot of length $\Delta t_{slot,a} \approx 166$ msec, is 137 minutes, known as the maximum state time MST.

Figure 6:
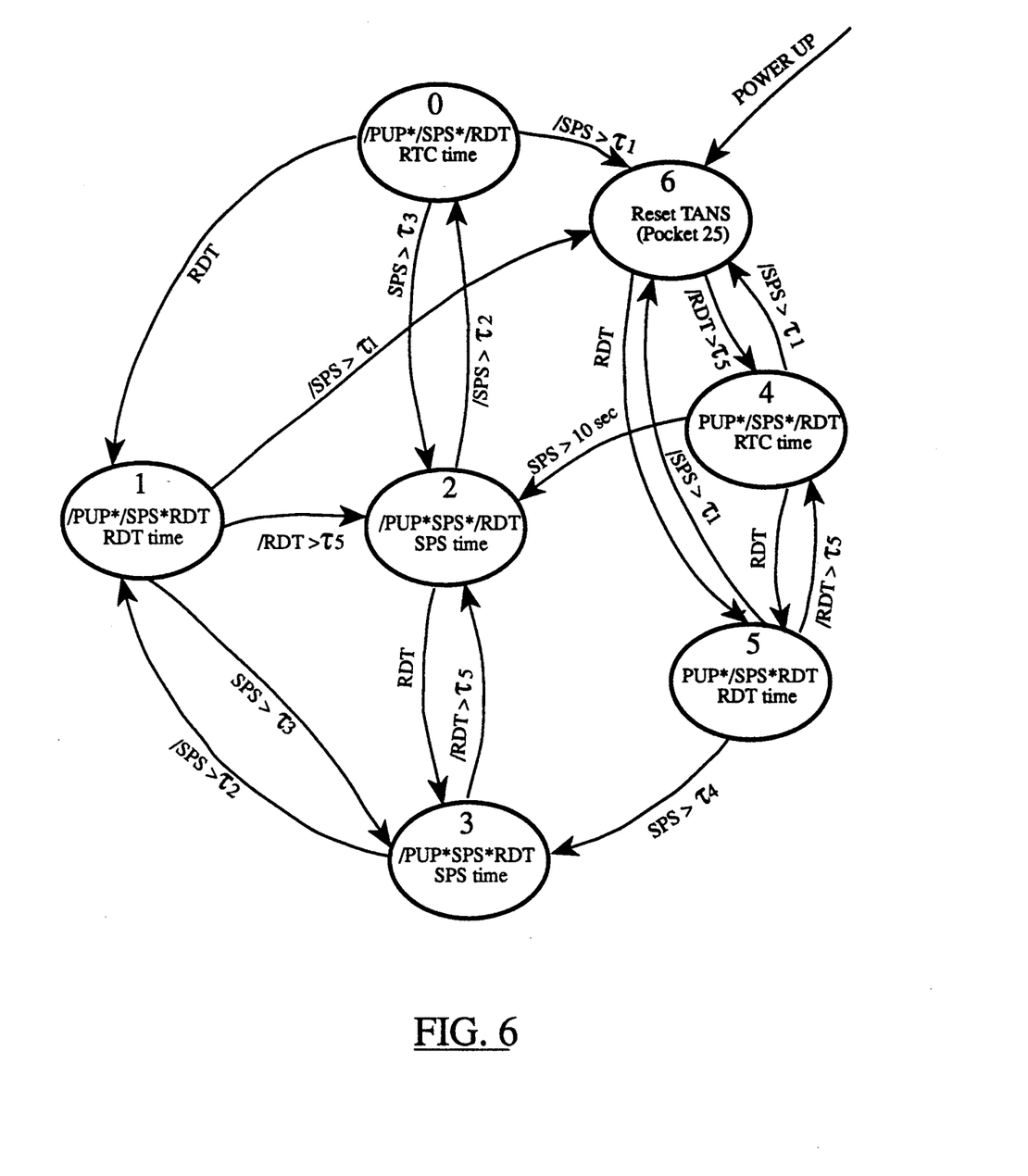

The temporal length of allocation time slots for TDMA communications may be increased for use of either the SPS or the RDT timing signal sequence, or both, by adding more complexity to the permissible TSS transitions. A first example of this approach is to switch back to the SPS timing signal after the RDT timing signal is lost and after losing the SPS signal at time t=0, for the time interval $\tau 2 < t < \tau 1$. This can be implemented by removing the original TSS transition 1→0 and adding a new TSS transition 1→2 that is activated after loss of RDT timing signal for a time interval of at least $\tau 5$. Implementation of this set of TSS transitions is illustrated in FIG. 6.

Figure 7:
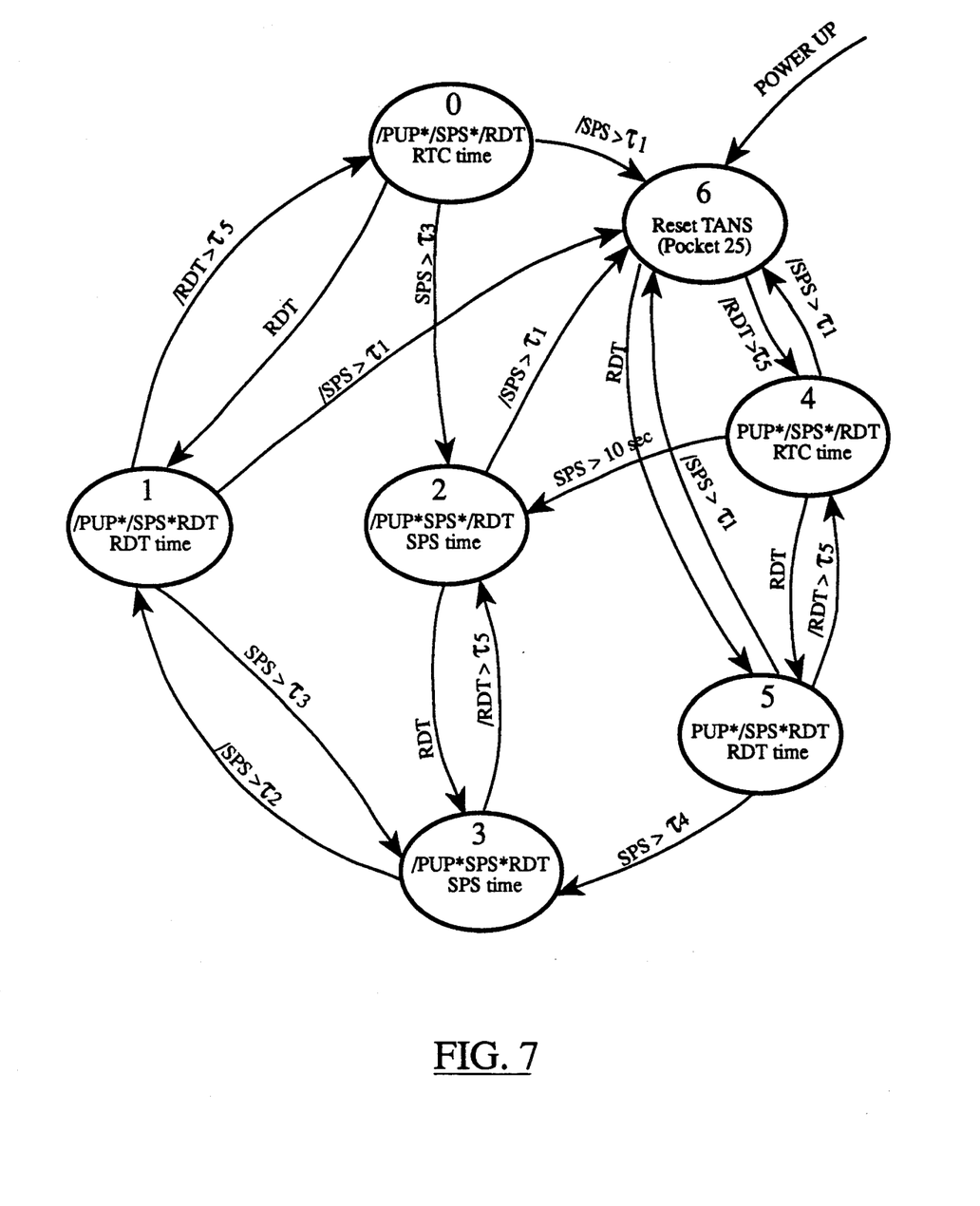

A second alternative to the basic approach allows the SPS and RDT timing signal cumulative drifts to expand to the maximum drift error allowed to meet the exact six-time-slot-per-second allocation. A third alternative to the basic approach allows the SPS timing signal cumulative drift time to increase to the time interval length $\tau 1$. This change can be implemented by removing the original TSS transition 2→0 and adding a new TSS transition 2→6 that depends upon loss of SPS timing signal for at least a time interval of $\tau 1$. Implementation of this set of TSS transitions is illustrated in FIG. 7. Thus, several approaches exist, each approach relying upon 18 transitions between the 7 TSSs 0, 1, 2, 3, 4, 5 and 6, with each TSS making transitions to at least two other TSSs (referred to as "outgoing" transitions) and being the destination TSS for transitions from at least other TSSs (referred to as "incoming" transitions).

If the present position of a vehicle within a given metropolitan area is known with sufficient accuracy, a timing signal received from a single satellite in a SPS provides an accurate timing signal.

Use of a single-satellite timekeeping mode is also appropriate when limited satellite visibility is present— for example, when the vehicle is travelling in an urban canyon with steep walls defined by adjacent tall buildings. In an extreme situation, all SPS satellite signals may be lost for some time interval. If the vehicle that loses SPS signal is a bus or other vehicle that travels a predetermined route defined by a sequence of straight line segments (with an occasional curved segment), the vehicle can use dead reckoning for position determination along each straight line segment of the route. Optionally, the vehicle can transmit a transition signal to a base station each time the vehicle reaches the end of each one of these straight line segments and makes a transition to another straight line segment that is part of the assigned route. In a preferred embodiment, the bus continues to advise one or more of the base stations of its present location at the normal reporting intervals (e.g., two minutes), with an associated inaccuracy that can be kept small by suitable interpolation of the vehicle's location along the assigned route.

When SPS positions of a vehicle are being determined by the system, use of SPS timing signals is the most accurate method of synchronization. When SPS positions of a vehicle are not being determined, the RDT timing signal is used as a fallback timing signal. Need for the RDT timing signal might arise, for example, where the time packet is constructed, communicated to, and processed by, the system carried on the vehicle. The packet construction and transmission time delay should, preferably, be constant, and pure signal propagation delay is negligible compared to other system delays. For example, RDT packet propagation over a distance of 50 miles requiring about 268 $\mu$sec. Thus, the packet time delay is approximately constant and can be determined with sufficient accuracy using the move accurate SPS timing signals.

Because it is possible that the vehicle system could power up without having an initial SPS-determined position fix, and thus have no accurate timing signal, the vehicle has a default value $\tau_{def}$ for packet construction, propagation and processing time delay for the radio link from base station to vehicle so that the vehicle can begin to communicate with the base station as soon as the vehicle system is powered up and all required communication equipment is operable. As soon as an SPS-determined position is available, the default value $\tau_{def}$ can be refined or adjusted dynamically by comparing the time the RDT timing signal arrives with the time determined by the SPS timing signal. This also allows vehicles that are farther from the base station to dynamically compensate for the (small) difference in signal propagation delay, provided that the vehicle stays within the same signal repeater zone, if repeater zones are used.

The embodiment discussed above is based upon the following assumptions: (1) Radio communication uses a TDMA protocol with a maximum epoch period (time interval between two consecutive communications of location of any given vehicle) of 120 sec.; (2) TDMA protocol uses 6 time slots/sec., with 5 of these slots being allocated and one being a contention time slot; (3) Multiple copies of the same message can be received by a vehicle from a plurality of base station, with no likelihood of confusion; (4) A vehicle's VIM 25-i (FIG. 2) hears all messages, asserts the Data Carrier Detect line when a valid frame sync sequence is received, and passes all valid frame sync messages to the timing processor on board the vehicle; (5) Maximum temperature slew rate for the operating environment on a vehicle is 10° C./minute; (6) Key-up time (reaching $\geq 90$ percent max power) and key-down time (reaching $\leq 10$ percent max power) are each $\leq 15$ msec; (7) The zero reference point for the RDT timing signal start occurs at the beginning of an antenna output signal from a base station; (8) Accurate time for a vehicle is chosen from the most accurate and available time among SPS time, RDT time and RTC time, in that order; and (9) Where the RDT timing signal is used to determine accurate time for a vehicle, the RDT calibration period for that vehicle is reduced to 15 sec., with each such calibration containing at least one RDT time-stamped message.

The Global Positioning System (GPS) is part of a satellite-based navigation system developed by the United States Defense Department under its NAVSTAR program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11,967 hours) orbital time intervals, so that the satellites move with time relative to the Earth below. Theoretically, as many as eight GPS satellites will be visible at one time from most points on the Earth's surface, and visual access to one or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two L-band carrier signals: an L1 signal having a frequency $f1=1575.42$ MHz and an L2 signal having a frequency $f2=1227.6$ MHz. These two frequencies are integral multiples $f1=1500$ $f0$ and $f2=1200$ $f0$ of a base frequency $f0=1.023$ MHz. The L1 and L2 signals from each satellite are binary phase shift key (BPSK) modulated by predetermined pseudo random noise (PRN) codes that are different for each of the GPS satellites deployed. One motivation for use of two carrier signals L1 and L2 is to allow partial compensation for propagation delay of such a signal through the ionosphere, which delay varies approximately as the inverse square of signal frequency $f$ (delay $\propto f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and time of observation, and for providing navigation information. A signal transmitted by a particular GPS signal is selected by generating and matching, or correlating, the PRN code for that particular satellite. All PRN codes are known and are stored in GPS satellite signal receivers carried by ground observers. A first PRN code for each GPS satellite, sometimes referred to as a precision code or P-code, is a relatively long, fine-grained code having an associated clock rate of $10$ $f0=10.23$ MHz. A second PRN code for each GPS satellite, sometimes referred to as a clear/acquisition code or C/A code, is intended to facilitate rapid satellite signal acquisition and is a relatively short, coarser-grained code having a clock rate of $f0=1.023$ MHz. The C/A code for any GPS satellite has a length of 1023 chips or time increments before this code repeats. The P-code for any GPS satellite has a length of precisely one week (7.000 days) before this code repeats. The GPS satellite bit stream includes information on the ephemeris of each GPS satellite, parameters identifying the particular GPS satellite, and corrections for ionospheric signal propagation delays. A useful discussion of the GPS and techniques for obtaining position information from the satellite signals is found in *Guide To GPS Positioning*, edited by David Wells, Canadian GPS Associates, 1986.

A second configuration for global positioning is the GLONASS system, placed in orbit by the former Soviet Union. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9\ k/16)$ MHz and $f2=(1.246+7\ k/16)$ MHz, where $k$ ($=0, 1, 2, \ldots, 23$) is the channel or satellite number. Because the channel frequencies are distinguishable from each other, the codes are the same for each satellite. Reference to a Satellite Positioning System (SPS) herein refers to a GPS satellite configuration, to a GLONASS satellite configuration, and to any other satellite configuration used to provide accurate position and time for an observer on or adjacent to the Earth.

We claim:

1. A method of providing a system timing signal sequence for each of a plurality of N vehicles, numbered consecutively $i=1,2,\ldots,N(N\geq 2)$ that move within a selected geographic region and that communicate with one or more base stations, located within or adjacent to the selected region, by radiowaves, the method comprising the steps of:

providing a sequence of M non-overlapping time slots ($M\geq 2$) of approximately equal length that include substantially all times in a selected time interval;

allocating an ith group of these time slots, numbered consecutively $i=1,2,\ldots,N$, to communication by vehicle number i with a base station, where no two groups of time slots have any time slots in common;

providing each vehicle with a sequence of SPS signals and SPS timing signals and with a SPS signal transceiver/processor that receives and processes these SPS signals and SPS timing signals, to determine the present location of that vehicle and the time of determination of vehicle location;

transmitting from one or more base stations a sequence of base station timing signals that are received by each vehicle;

providing each vehicle with a timing signal choice means for receiving the SPS timing signal sequence and the base station timing signal sequence, for determining which of these sequences is both presently available and presently most accurate, and for using the available and most accurate timing signal sequence to provide that vehicle with a vehicle timing signal sequence and to determine the allocated time slots for that vehicle, based upon the most accurate timing sequence available; and transmitting selected vehicle operating data, including present vehicle location, from each vehicle to one or more base stations during each time slot that is allocated to that vehicle.

2. The method of claim 1, further comprising the steps of:
providing for each of said vehicles an on-board timing signal sequence that is generated by a timing signal source located on said vehicle and that is received by said timing signal choice module; and
causing said timing signal choice module to choose the presently available and presently most accurate timing signal, for use by said vehicle transceiver/processor for transmitting said selected vehicle operating data, from among said SPS timing signal sequence, said base station timing signal sequence and the on-board timing signal sequence.

3. The method of claim 2, further comprising the step of providing said presently most accurate timing signal with a timing inaccuracy that does not exceed 7 msec.

4. The method of claim 2, further comprising the step of providing said presently most accurate timing signal with a timing inaccuracy that does not exceed 2 msec.

5. The method of claim 1, further comprising the step of choosing SPS timing signal sequence as said most accurate timing sequence, when said SPS timing signal sequence and said base station timing signal sequence are both available.

6. The method of claim 1, further comprising the step of allocating an (N+1)th group of said time slots as contention time slots, within which any of said vehicles numbered i=1, 2, ..., N may communicate with said base station by contention, where this (N+1)th group of time slots has no time slot in common with any of said groups number 1, 2, ..., N of time slots.

7. The method of claim 1, further comprising the step of choosing as said selected time interval a time interval of length approximately one second.

8. The method of claim 7, further comprising the step of choosing said integer M to lie in the range 5–20.

9. The method of claim 7, further comprising the step of allocating said time slots according to a time division multiple access allocation method, wherein at least one of said time slots within any of said selected time intervals is a contention time slot that may be taken and used for communication by any of said vehicles.

10. The method of claim 1, further comprising the step of transmitting said vehicle operating data for a specified vehicle at least once in any time interval of a selected length $\tau 6$.

11. The method of claim 10, further comprising the step of choosing said time interval length $\tau 6$ to be no greater than 120 seconds.

12. The method of claim 2, further comprising the steps of:
distinguishing a plurality of seven transition status states, numbered consecutively 0, 1, 2, 3, 4, 5 and 6, within said system that described the present timing state on said vehicle, where these states have the following characteristics:
said SPS timing signal sequence is not available in states 0. 1. 4. 5 and 6 and is available in states 2 and 3;
said base station timing signal sequence is not available in states 0, 2 and 4 and is available in states 1, 3 and 5;
said on-board timing signal sequence is available in all states 0, 1, 2, 3, 4, 5 and 6;

said system makes a transition from state 0 to state 1 when said base station timing signal sequence is regained;
said system makes a transition from state 0 to state 2 when said SPS timing signal sequence is regained for a time at least equal to a selected time interval $\tau 3$;
said system makes a transition from state 0 to state 6 when said SPS timing signal sequence is lost for a time at least equal to a selected time interval $\tau 1$, and power for said system has been regained;
said system makes a transition from state 1 to state 0 when said base station timing signal sequence is lost for a time at least equal to a selected time interval $\tau 5$;
said system makes a transition from state 1 to state 3 when said SPS timing signal sequence is regained for a time at least equal to the selected time interval $\tau 3$;
said system makes a transition from state 1 to state 6 when said SPS timing signal sequence is lost for a time at least equal to the selected time interval $\tau 1$;
said system makes a transition from state 2 to state 0 when said SPS timing signal sequence is lost for a time at least equal to a selected time interval $\tau 2$;
said system makes a transition from state 2 to state 3 when said base station timing signal sequence is regained;
said system makes a transition from state 3 to state 1 when said SPS timing signal sequence is lost for a time at least equal to the selected time interval $\tau 2$;
said system makes a transition from state 3 to state 2 when said base station timing signal sequence is lost for a time at least equal to the selected time interval $\tau 5$;
said system makes a transition from state 4 to state 2 when 2 said SPS timing signal sequence is regained for a time at least equal to a selected time interval $\tau 4$;, and power for said system is lost;
said system makes a transition from state 4 to state 5 when said base station timing signal sequence is regained;
said system makes a transition from state 4 to state 6 when said SPS timing signal sequence is lost for a time at least equal to the selected time interval $\tau 1$;
said system makes a transition from state 5 to state 3 when said SPS timing signal sequence is regained for a time at least equal to the selected time interval $\tau 4$, and power for said system is lost;
said system makes a transition from state 5 to state 4 when said base station timing signal sequence is lost for a time at least equal to the selected time interval $\tau 5$;
said system makes a transition from state 5 to state 6 when said SPS timing signal sequence is lost for a time at least equal to the selected time interval $\tau 1$;
said system makes a transition from state 6 to state 4 when said base station timing signal sequence is lost for a time at least equal to a selected time interval $\tau 5$;

said system makes a transition from state 6 to state 5 when said base station timing signal sequence is regained; and said system initially is in state 6 when power for said system is initially applied or is reapplied.

13. The method of claim 12, further comprising the step of choosing said selected time interval $\tau 1$ to be approximately 60 minutes.

14. The method of claim 12, further comprising the step of choosing said selected time interval $\tau 2$ to be approximately 37.6 minutes.

15. The method of claim 12, further comprising the step of choosing said selected time interval $\tau 3$ to be in the range 3–6 seconds.

16. The method of claim 12, further comprising the step of choosing said selected time interval $\tau 4$ to be in the range 4–10 seconds.

17. The method of claim 12, further comprising the step of choosing said selected time interval $\tau 5$ to be in the range 0–3.7 minutes.

18. The method of claim 2, further comprising the steps of:

distinguishing a plurality of seven transition status states, numbered consecutively 0, 1, 2, 3, 4, 5 and 6, within said system that describe the present timing state on said vehicle, where these states have the following characteristics:

said SPS timing signal sequence is not available in states 0, 1, 4, 5 and 6 and is available in states 2 and 3;

said base station timing signal sequence is not available in states 0, 2 and 4 and is available in states 1, 3 and 5;

said on-board timing sequence is available in all states 0, 1, 2, 3, 4, 5 and 6;

said system makes a transition from state 0 to state 1 when said base station timing signal sequence is regained;

said system makes transition from state 0 to state 2 when said SPS timing signal sequence is regained for a time at least equal to a selected time interval $\tau 3$;

said system makes a transition from state 0 to state 6 when said SPS timing signal sequence is lost for a time at least equal to a selected time interval $\tau 1$, and power for said system has been regained;

said system makes a transition from state 1 to state 2 when said base station timing signal sequence is lost for a time at least equal to a selected time interval $\tau 5$;

said system makes a transition from state 1 to state 3 when said SPS timing signal sequence is regained for a time at least equal to the selected time interval $\tau 3$;

said system makes a transition from state 1 to state 6 when said SPS timing signal sequence is lost for a time at least equal to the selected time interval $\tau 1$;

said system makes a transition from state 2 to state 0 when said SPS timing signal sequence is lost for a time at least equal to a selected time interval $\tau 2$;

said system makes a transition from state 2 to state 3 when said base station timing signal sequence is regained;

said system makes a transition from state 3 to state 1 when said SPS timing signal sequence is lost for a time at least equal to the selected time interval $\tau 2$;

said system makes a transition from state 3 to state 2 when said base station timing signal sequence is lost for a time at least equal to the selected time interval $\tau 5$;

said system makes a transition from state 4 o state 2 when said SPS timing signal sequence is regained for a time at least equal to a selected time interval $\tau 4$;, and power for said system is lost;

said system makes a transition from state 4 to state 5 when said base station timing signal sequence is regained;

said system makes a transition from state 4 to state 6 when said SPS timing signal sequence is lost for a time at least equal to the selected time interval $\tau 1$;

said system makes a transition from state 5 to state 3 when said SPS timing signal sequence is regained for a time at least equal to the selected time interval $\tau 4$, and power for said system is lost;

said system makes a transition from state 5 to state 4 when said base station timing signal sequence is lost for a time at least equal to the selected time interval $\tau 5$;

said system makes a transition from state 5 to state 6 when said SPS timing signal sequence is lost for a time at least equal to the selected time interval $\tau 1$;

said system makes a transition from state 6 to state 4 when said base station timing signal sequence is lost for a time at least equal to a selected time interval $\tau 5$;

said system makes a transition from state 6 to state 5 when said base station timing signal sequence is regained; and said system initially is in state 6 when power for said system is initially applied or is reapplied.

19. The method of claim 2, further comprising the steps of:

distinguishing a plurality of seven transition status states, numbered consecutively 0, 1, 2, 3, 4, 5 and 6, within said system that describe the present timing state on said vehicle, where these states have the following characteristics:

said SPS timing signal sequence is not available in states 0, 1, 4, 5 and 6 and is available in states 2 and 3;

said base station timing signal sequence is not available in states 0, 2 and 4 and is available in states 1, 3 and 5;

said on-board timing signal sequence is available in all states 0, 1, 2, 3, 4, 5 and 6;

said system makes a transition from state 0 to state 1 when said base station timing signal sequence is regained;

said system makes a transition from state 0 to state 2 when said SPS timing signal sequence is regained for a time at least equal to a selected time interval $\tau 3$;

said system makes a transition from state 0 to state 6 when said SPS timing signal sequence is lost for a time at least equal to a selected time interval $\tau 1$, and power for said system has been regained;

said system makes a transition from state 1 to state 0 when said base station timing signal sequence is lost for a time at least equal to a selected time interval τ5;

said system makes a transition from state 1 to state 3 when said SPS timing signal sequence is regained for a time at least equal to the selected time interval τ3;

said system makes a transition from state 1 to state 6 when said SPS timing signal sequence is lost for a time at least equal to the selected time interval τ1;

said system makes a transition from state 2 to state 6 when said SPS timing signal sequence is lost for a time at least equal to a selected time interval τ1;

said system makes a transition from state 2 to state 3 when said base station timing signal sequence is regained;

said system makes a transition from state 3 to state 1 when said SPS timing signal sequence is lost for a time at least equal to the selected time interval τ2;

said system makes a transition from state 3 to state 2 when said base station timing signal sequence is lost for a time at least equal to the selected time interval τ5;

said system makes a transition from state 4 o state 2 when said SPS timing signal sequence is regained for a time at least equal to a selected time interval τ4;, and power for said system is lost;

said system makes a transition from state 4 to state 5 when said base station timing signal sequence is regained;

said system makes a transition from state 4 to state 6 when said SPS timing signal sequence is lost for a time at least equal to the selected time interval τ1;

said system makes a transition from state 5 to state 3 when said SPS timing signal sequence is regained for a time at least equal to the selected time interval τ4, and power for said system is lost;

said system makes a transition from state 5 to state 4 when said base station timing signal sequence is lost for a time at least equal to the selected time interval τ5;

said system makes a transition from state 5 to state 6 when said SPS timing signal sequence is lost for a time at least equal to the selected time interval τ1;

said system makes a transition from state 6 to state 4 when said base station timing signal sequence is lost for a time at least equal to a selected time interval τ5;

said system makes a transition from state 6 to state 5 when said base station timing signal sequence is regained; and said system initially is in state 6 when power for said system is initially applied or is reapplied.

20. The method of claim 2, further comprising the steps of:

distinguishing a plurality of seven transition status states, numbered consecutively 0, 1, 2, 3, 4, 5 and 6, within said system that describe the present timing state on said vehicle, where these states have the following characteristics:

said SPS timing signal sequence is not available in states 0, 1, 4, 5 and 6 and is available in states 2 and 3;

said base station timing signal sequence is not available in states 0, 2 and 4 and is available in states 1, 3 and 5; and said on-board timing signal sequence is available in all states 0, 1, 2, 3, 4, 5 and 6; and allowing at least 18 transitions between the states 0, 1, 2, 3, 4, 5 and 6, when said SPS timing signal sequence is lost for a selected first time interval, when said SPS timing signal sequence is regained for a selected second time interval, when said base station timing signal sequence is lost for a selected third time interval, or when said base station timing signal sequence is regained, where each state has at least two incoming transitions and at least two outgoing transitions.

21. The method of claim 1, further comprising the step of choosing said SPS from a group consisting of a Global Positioning System and a Global Orbiting Navigational System.

22. The method of claim 1, further comprising the step of using said SPS timing signals to determine a signal propagation time delay for said base station timing signals to reach said vehicle.

23. A method of providing a system timing signal sequence, with a timing inaccuracy no larger than 2 msec, for each of a plurality of N vehicles, numbered consecutively i=1, 2, ..., N (N≥2) that move within a selected geographic region and that communicate with one or more base stations, located within or adjacent to the selected region, by radiowaves, the method comprising the steps of:

providing a sequence of M non-overlapping time slots (M≥2) of approximately equal length that include substantially all times in a selected time interval;

allocating an ith group of these time slots, numbered consecutively i=1, 2, ..., N, to communication by vehicle number i with a base station, where no two groups of time slots have any time slots in common;

providing each vehicle with first and second independent sequences of timing signals that each provide acceptably accurate timing on each vehicle, where the first sequence is a sequence of SPS signals and SPS timing signals;

providing each vehicle with a SPS signal transceiver/processor that receives and processes these SPS signals and SPS timing signals, to determine the present location of that vehicle and the time of determination of vehicle location;

providing each vehicle with a timing signal choice means that receives first and second sequences of timing signals, determines which of these sequences is both presently available and presently most accurate, and uses the available and most accurate timing signal sequence to provide that vehicle with a vehicle timing signal sequence and to determine the allocated time slots for that vehicle, based upon the most accurate timing sequence available; and transmitting selected vehicle operating data, including present vehicle location, from each vehicle to one or more base stations during each time slot that is allocated to that vehicle.

24. The method of claim 23, further comprising the step of choosing said first timing signal sequence as said most accurate timing sequence, when said first and second timing signal sequences are both available.

25. The method of claim 23, further comprising the step of allocating a (N+1)th group of said M time slots as contention time slots, within which any of said vehicles numbered i=1, 2, ..., N may communicate with said base station by contention, where this (N+1)th group of time slots has no time slot in common with any of said groups number 1, 2, ..., N of time slots.

* * * * *